(12) United States Patent
Manzen

(10) Patent No.: US 8,345,658 B2
(45) Date of Patent: Jan. 1, 2013

(54) MOBILE COMMUNICATION TERMINAL WITH GPS FUNCTION, POSITIONING SYSTEM, OPERATION CONTROL METHOD, AND PROGRAM

(75) Inventor: Yoshihisa Manzen, Tokyo (JP)

(73) Assignee: NEC Corporation, Tokyo (JP)

( * ) Notice: Subject to any disclaimer, the term of this patent is extended or adjusted under 35 U.S.C. 154(b) by 951 days.

(21) Appl. No.: 12/443,041

(22) PCT Filed: Sep. 11, 2007

(86) PCT No.: PCT/JP2007/067684
§ 371 (c)(1),
(2), (4) Date: Mar. 26, 2009

(87) PCT Pub. No.: WO2008/047521
PCT Pub. Date: Apr. 24, 2008

(65) Prior Publication Data
US 2010/0041416 A1    Feb. 18, 2010

(30) Foreign Application Priority Data
Oct. 18, 2006   (JP) ................................ 2006-283212

(51) Int. Cl.
*H01J 3/06* (2006.01)
*H04J 3/06* (2006.01)
(52) U.S. Cl. ........................................ 370/350; 370/324
(58) Field of Classification Search .................. None
See application file for complete search history.

(56) References Cited

U.S. PATENT DOCUMENTS

| | | | |
|---|---|---|---|
| 5,392,450 A * | 2/1995 | Nossen | 455/12.1 |
| 5,598,166 A * | 1/1997 | Ishikawa et al. | 342/357.3 |
| 5,740,048 A * | 4/1998 | Abel et al. | 701/470 |
| 5,917,444 A | 6/1999 | Loomis et al. | |
| 6,023,239 A * | 2/2000 | Kovach | 342/357.44 |
| 6,198,989 B1 * | 3/2001 | Tankhilevich et al. | 701/2 |
| 6,208,289 B1 * | 3/2001 | Haendel | 342/357.31 |
| 6,223,040 B1 * | 4/2001 | Dam | 455/447 |
| 6,243,483 B1 * | 6/2001 | Petrou et al. | 382/103 |

(Continued)

FOREIGN PATENT DOCUMENTS

JP    2002196063 A    7/2002

(Continued)

OTHER PUBLICATIONS

Supplementary European Search Report for EP 07 80 7093 dated Oct. 26, 2010.

(Continued)

*Primary Examiner* — Bunjob Jaroenchonwanit

(57) ABSTRACT

The present invention is to provide a mobile communication terminal with a GPS function capable of further varying the positioning performance of each positioning mode preinstalled in the terminal. A GPS positioning section of the mobile communication terminal with the GPS function can perform positioning in a plurality of positioning modes using the A-GPS system. When a GPS control section of the mobile communication terminal with the GPS function causes the GPS positioning section to perform positioning, the GPS control section sets a positioning mode in the GPS positioning section, varies an allowable error of a communication synchronizing clock established between the terminal and a base station as a parameter relating to the positioning performance of GPS positioning based on the A-GPS system in which a fixed value has been conventionally used, and sets the allowable error in GPS positioning means.

12 Claims, 6 Drawing Sheets

U.S. PATENT DOCUMENTS

| | | | |
|---|---|---|---|
| 6,317,603 B1* | 11/2001 | Allison | 455/456.1 |
| 6,408,178 B1* | 6/2002 | Wickstrom et al. | 455/427 |
| 6,473,030 B1* | 10/2002 | McBurney et al. | 342/357.43 |
| 6,597,985 B2* | 7/2003 | Toyooka | 701/478.5 |
| 6,771,629 B1* | 8/2004 | Preston et al. | 370/337 |
| 7,012,563 B1 | 3/2006 | Bustamante et al. | |
| 7,133,397 B2* | 11/2006 | Jones et al. | 370/350 |
| 7,218,275 B2* | 5/2007 | Han | 342/357.22 |
| 7,258,305 B1* | 8/2007 | Murphy | 244/158.4 |
| 7,286,081 B2* | 10/2007 | Taniguchi | 342/357.42 |
| 8,134,938 B2* | 3/2012 | Yi et al. | 370/255 |
| 2002/0082774 A1 | 6/2002 | Bloebaum | |
| 2003/0011511 A1* | 1/2003 | King et al. | 342/357.02 |
| 2003/0069033 A1* | 4/2003 | Edge et al. | 455/502 |
| 2003/0128163 A1* | 7/2003 | Mizugaki et al. | 342/464 |
| 2003/0148761 A1* | 8/2003 | Gaal | 455/423 |
| 2004/0034471 A1* | 2/2004 | Rorabaugh | 701/214 |
| 2004/0039504 A1* | 2/2004 | Coffee et al. | 701/35 |
| 2004/0063411 A1 | 4/2004 | Goldberg et al. | |
| 2004/0176127 A1* | 9/2004 | Ballantyne et al. | 455/552.1 |
| 2004/0203915 A1* | 10/2004 | van Diggelen et al. | 455/456.1 |
| 2004/0245369 A1* | 12/2004 | McKendree et al. | 244/3.15 |
| 2005/0062643 A1* | 3/2005 | Pande et al. | 342/357.1 |
| 2005/0090265 A1* | 4/2005 | Abraham | 455/456.1 |
| 2005/0162306 A1* | 7/2005 | Babitch et al. | 342/357.05 |
| 2005/0248485 A1* | 11/2005 | Hatch et al. | 342/357.12 |
| 2005/0285783 A1* | 12/2005 | Harper | 342/357.15 |
| 2006/0055596 A1* | 3/2006 | Bryant et al. | 342/357.06 |
| 2006/0211430 A1* | 9/2006 | Persico | 455/456.1 |
| 2007/0239347 A1* | 10/2007 | Watanabe et al. | 701/200 |
| 2008/0275995 A1* | 11/2008 | Soliman et al. | 709/230 |
| 2009/0009387 A1* | 1/2009 | Malaney | 342/357.1 |
| 2010/0009662 A1* | 1/2010 | Khosravy et al. | 455/414.1 |
| 2010/0217723 A1* | 8/2010 | Sauerwein et al. | 705/337 |
| 2010/0222081 A1* | 9/2010 | Ward et al. | 455/456.3 |
| 2010/0286896 A1* | 11/2010 | Yamada | 701/117 |

FOREIGN PATENT DOCUMENTS

| | | | |
|---|---|---|---|
| JP | 2002221563 A | * | 8/2002 |
| JP | 2003161772 A | | 6/2003 |
| JP | 2003167042 A | | 6/2003 |
| JP | 2004144693 A | | 5/2004 |
| JP | 200 017735 A | | 1/2006 |
| JP | 2006153873 A | | 6/2006 |

OTHER PUBLICATIONS

International Search Report for PCT/JP2007/067684 mailed Oct. 16, 2007.

* cited by examiner

F I G. 3
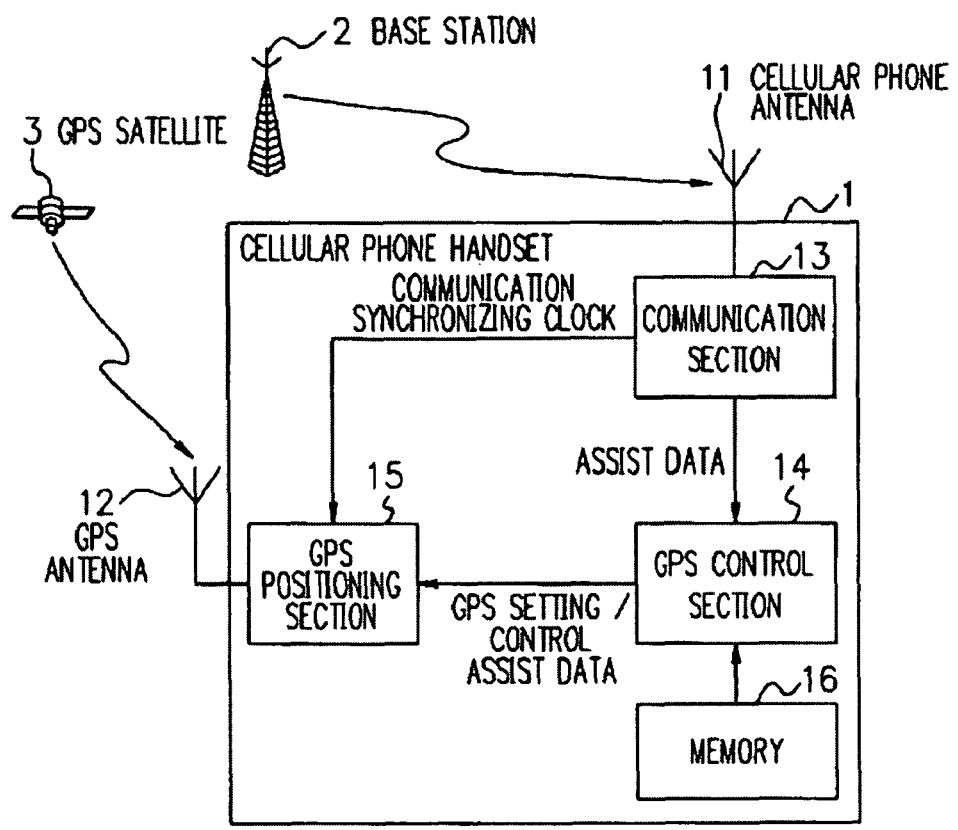
F I G. 4
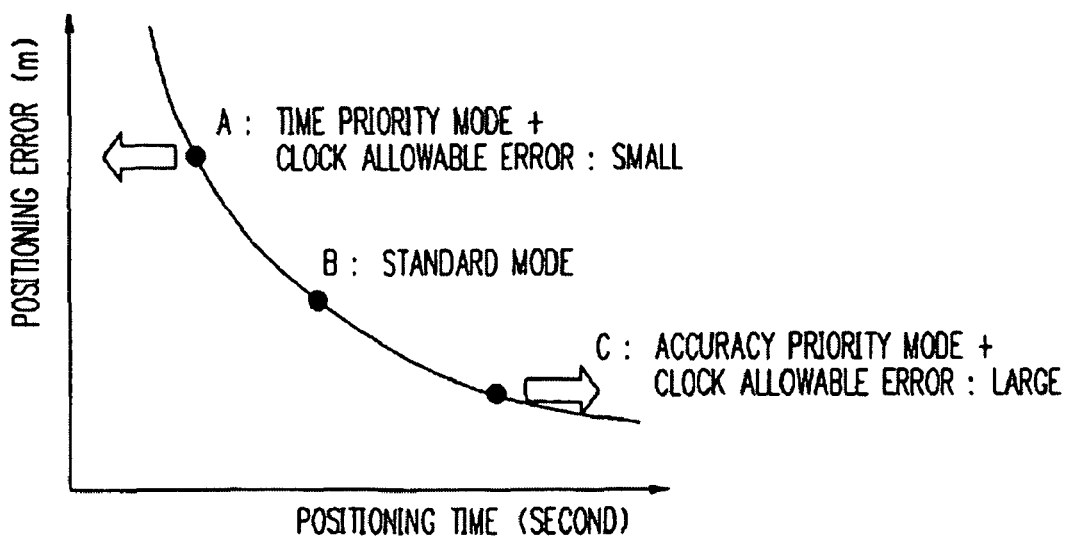

MOBILE COMMUNICATION TERMINAL WITH GPS FUNCTION, POSITIONING SYSTEM, OPERATION CONTROL METHOD, AND PROGRAM

This application is the National Phase of PCT/JP2007/067684, filed Sep. 11. 2007, which is based upon and claims the benefit of priority from Japanese patent application No. 2006-283212, filed on Oct. 18, 2006, the disclosure of which is incorporated herein in its entirety by reference.

BACKGROUND OF THE INVENTION

1. Technical Field

The present invention relates to a mobile communication terminal with a GPS function, a positioning system, an operation control method, and a program and, more particularly, to a mobile communication terminal with a GPS function which performs GPS (Global Positioning System) positioning by using assist data received from a network.

2. Description of Related art

In recent years, the A-GPS (Assisted-GPS) system that has allowed sensitive, high-speed positioning by receiving assist data from a network (see, e.g., Patent Document 1) has become dominant among GPS systems for mobile communication terminals such as a cellular phone handset. FIG. 1 is a view showing the configuration of a positioning system using the A-GPS system described in Patent Document 1. Note that, in FIG. 1, a base station 2 is connected to a communication network (not shown), and a cellular phone handset 10 is wirelessly connected to the network through the base station 2.

The cellular phone handset 10 receives and uses, as assist data, pieces of information such as an estimated time (GPS time), an estimated position of the cellular phone handset 10, the navigation data (an almanac, ephemeris, and the like) of GPS satellites 3-1 to 3-3 and uses a high-accuracy communication synchronizing clock established between the cellular phone handset 10 and the base station 2 at the time of communication with the base station 2. This realizes higher-speed, higher-accuracy positioning than the general GPS system.

It is generally desirable for GPS positioning to realize short-time, high-accuracy positioning. As shown in FIG. 2, however, there is actually a trade-off between a positioning time and an accuracy of position: a reduction in positioning time reduces the accuracy of position while an improvement in positioning accuracy requires the longer positioning time. A GPS function using the A-GPS system described in Patent Document 1 has a plurality of positioning modes (e.g., a time priority mode (A), a standard mode (B), and an accuracy priority mode (C) shown in FIG. 2) with different positioning performances. Mode setting allows positioning-time-priority GPS positioning and positioning-accuracy-priority GPS positioning.

For example, in the case of a GPS function with the feature shown in FIG. 2, predetermining the performance at a point A as that in the positioning-time-priority mode, the performance at a point C as that in the positioning-accuracy-priority mode. and the performance at a point B which is a performance intermediate between that in the positioning-time-priority mode and that in the positioning-accuracy-priority mode as the standard mode with a good positioning time/positioning accuracy balance makes it possible to perform the GPS positioning in a desired one of the three positioning modes.

Patent Document 1
  Japanese Patent Laid Open Publication No. 2002-196063

SUMMARY

However, even if the GPS function has a plurality of positioning modes, as described above, it is impossible to perform positioning with a positioning performance other than the positioning performance of each positioning mode preinstalled in a terminal.

An exemplary object of the present invention is to provide a mobile communication terminal with a GPS function, a positioning system, an operation control method, and a program capable of further varying the positioning performance of each positioning mode preinstalled in a terminal.

Means for Solving the Problems

An exemplary aspect according to the present invention is a mobile communication terminal with a GPS function including GPS positioning means for performing GPS (Global Positioning System) positioning using assist data received from a network, including control means for varying an allowable error of a communication synchronizing clock established between the mobile communication terminal and a base station of the network which is set in the GPS positioning means for the GPS positioning using the assist data.

An exemplary aspect according to the present invention is a positioning system including a mobile communication terminal with a GPS function and a network which supplies the assist data to the mobile communication terminal with the GPS function.

An exemplary aspect according to the present invention is an operation control method for a mobile communication terminal with a GPS function including GPS positioning means for performing GPS (Global Positioning System) positioning using assist data received from a network, including a step of varying an allowable error of a communication synchronizing clock established between the mobile communication terminal and a base station of the network which is set in the GPS positioning means for the GPS positioning using the assist data.

An exemplary aspect according to the present invention is a program for causing a computer to perform an operation control method for a mobile communication terminal with a GPS function including GPS positioning means for performing GPS (Global Positioning System) positioning using assist data received from a network, including a process of varying an allowable error of a communication synchronizing clock established between the mobile communication terminal and a base station of the network which is set in the GPS positioning means for the GPS positioning using the assist data.

Advantage of the Invention

The present invention has the effect that it is possible to further vary the positioning performance of each positioning mode preinstalled in a terminal by making variable an allowable error of a communication synchronizing clock as a parameter relating to the positioning performance (a positioning time and a positioning accuracy) of GPS positioning based on the A-GPS system.

BRIEF DESCRIPTION OF THE DRAWINGS

FIG. 3 is a diagram showing the configuration of a cellular phone handset with a GPS function according to an exemplary embodiment of the present invention;

FIG. 4 is a graph showing a change in the positioning performance of each positioning mode when varying a clock allowable error in the exemplary embodiment of the present invention;

DETAILED DESCRIPTION

An exemplary embodiment of the present invention will be described below with reference to the drawings.

Figure 1:
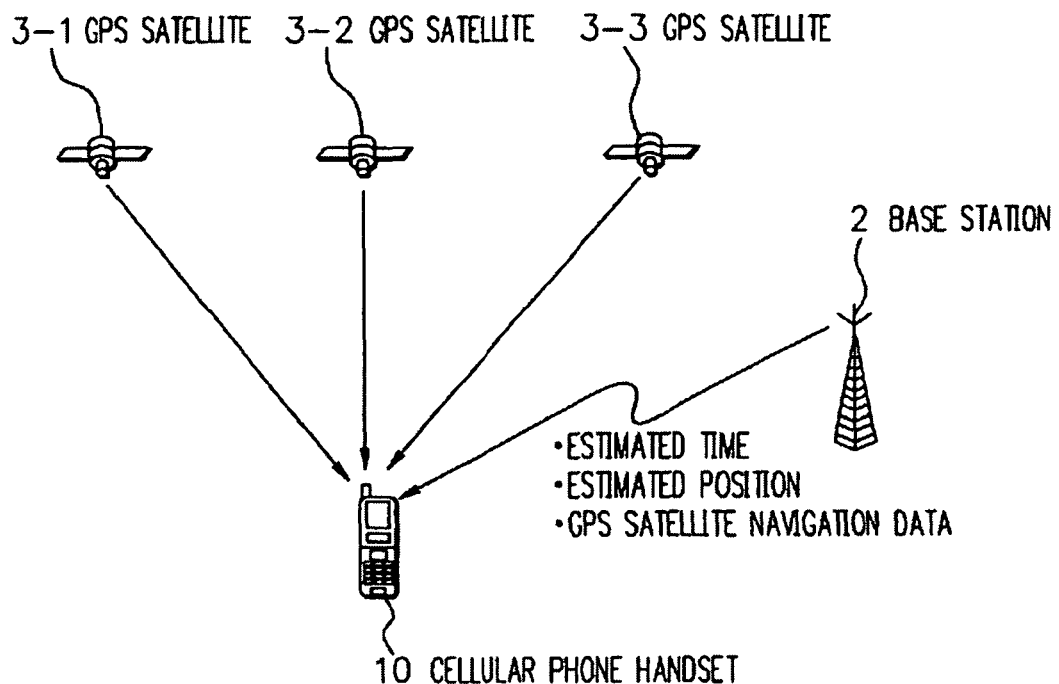
FIG. 1 is a view showing the configuration of a positioning system using the A-GPS system in the related art.

FIG. 3 is a diagram showing the configuration of a cellular phone handset with a GPS function according to the exemplary embodiment of the present invention. The configuration of a positioning system using a cellular phone handset 1 with a GPS function is the same as the system configuration shown in FIG. 1.

In FIG. 3, the cellular phone handset 1 with the GPS function includes a cellular phone antenna 11, a GPS antenna 12, a communication section 13 which communicates with a base station 2 connected to a network (not shown) using the cellular phone antenna 11, a GPS positioning section 15 which receives a signal from a GPS satellite 3 using the GPS antenna 12 and performs positioning, a GPS control section 14 which performs supply of assist data acquired from the network by the communication section 13 and makes settings for/controls the GPS positioning section 15, and a memory 16.

The communication section 13 supplies the assist data received from the network for positioning using the A-GPS system to the GPS control section 14 and supplies a high-accuracy communication synchronizing clock established between the communication section 13 and the base station 2 to the GPS positioning section 15 at the time of communication with the base station 2. The GPS control section 14 performs, on the GPS positioning section 15, GPS setting/control/supply of the assist data. The GPS positioning section 15 performs positioning using the assist data from the network and the high-accuracy communication synchronizing clock supplied from the communication section 13. The GPS positioning section 15 is capable of performing positioning in three positioning modes with different positioning performances (a time priority mode (A), a standard mode (B), and an accuracy priority mode (C)), in accordance with a positioning mode setting made by the GPS control section 14, as shown in FIG. 4.

In the A-GPS system, parameters to be set in the GPS positioning section 15 generally include an allowable error of an estimated position, an allowable error of an estimated time, and an allowable error of the communication synchronizing clock, in addition to the above-described setting of a positioning mode. These allowable errors are the maximum errors that the estimated position, estimated time, and communication synchronizing clock can take, and values of the allowable errors are predetermined by a system designer in consideration of various conditions. In particular, the value of the allowable error of the communication synchronizing clock is predetermined by a system designer in consideration of a base station error (a clock error caused by an oscillator of the base station), an AFC (Automatic frequency control) pull-in error in the terminal, an error caused by the Doppler effect during travel of the terminal, and the like.

Figure 5:
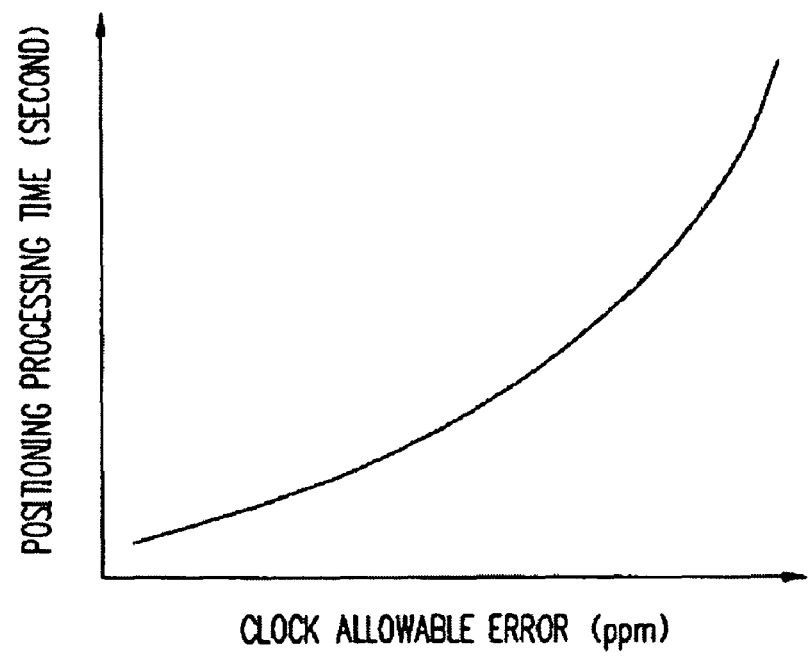
FIG. 5 is a graph showing the relationship between an allowable error of a communication synchronizing clock and a positioning processing time in positioning using the A-GPS system.

Among these allowable errors, the allowable error of the communication synchronizing clock generally has a significant effect on GPS positioning performance. A search window for acquiring a signal from the GPS satellite 3 is expanded if the value of the allowable error of the communication synchronizing clock is large, and the search window is narrowed if the value of the allowable error of the communication synchronizing clock is small. As shown in FIG. 5, the smaller the allowable error of the communication synchronizing clock is, the shorter a positioning processing time becomes and the more the GPS performance is improved. It is thus more advantageous to set a value as small as possible as the allowable error of the communication synchronizing clock. However, if the actual accuracy of the communication synchronizing clock exceeds the allowable error, acquisition of a signal from the GPS satellite 3 becomes difficult, and the GPS positioning performance is significantly degraded. Accordingly, a value larger than the actual accuracy of the communication synchronizing clock needs to be set as the allowable error of the communication synchronizing clock, and the value is predetermined by a system designer in consideration of the various conditions as described above.

Figure 6:
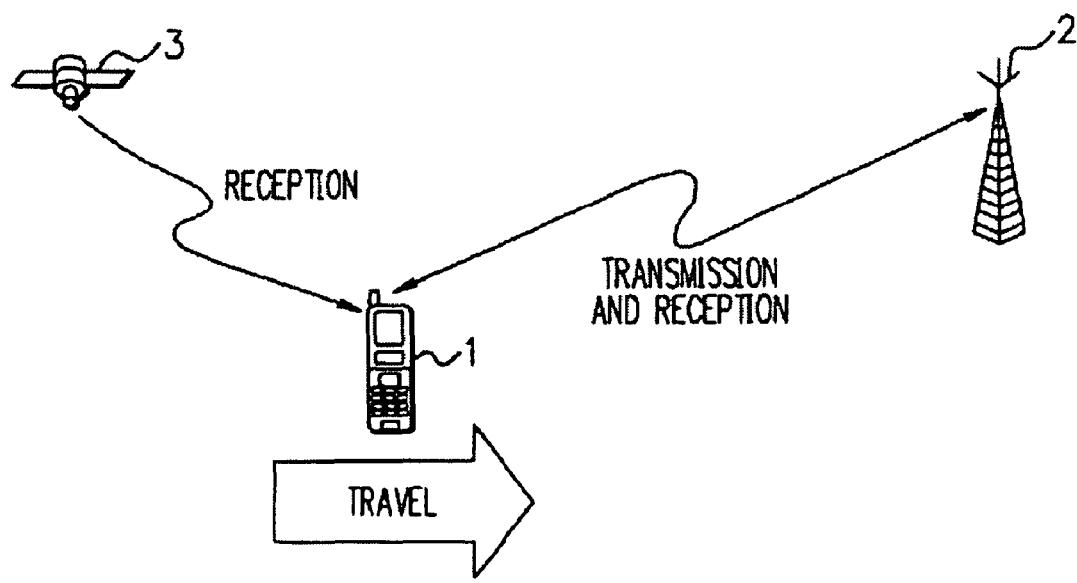
FIG. 6 is a view for explaining a shift in the communication synchronizing clock caused by the Doppler effect.
Figure 7:
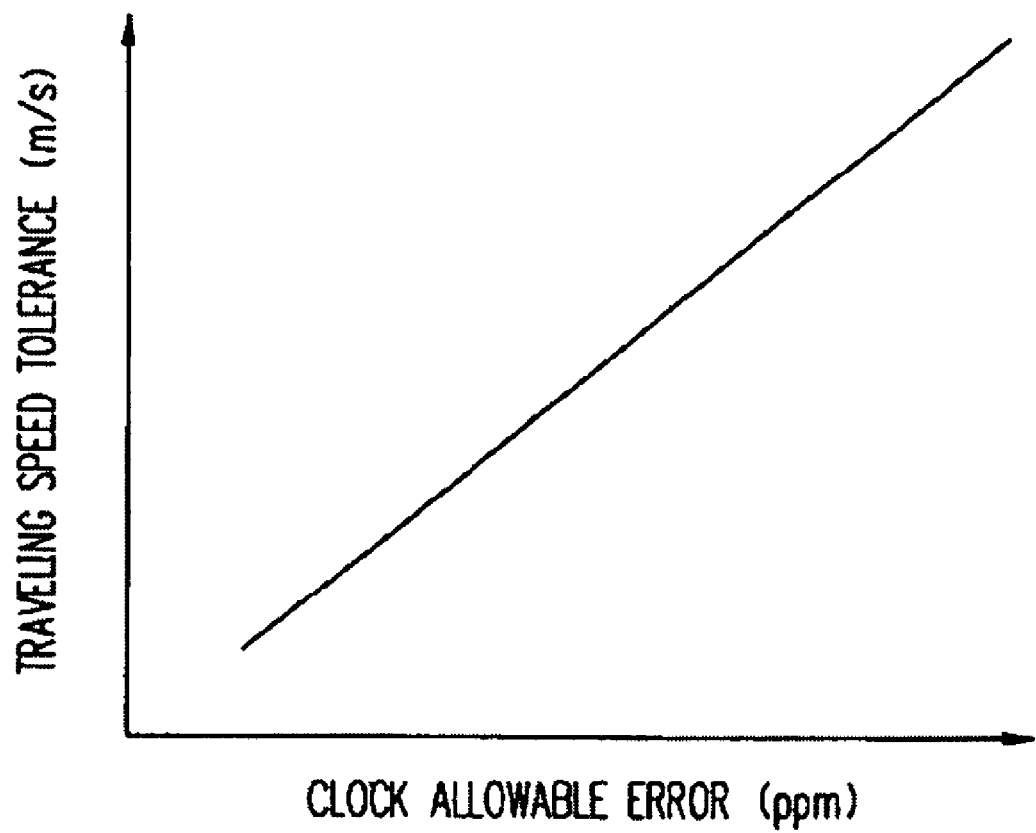
FIG. 7 is a graph showing the relationship between the allowable error of the communication synchronizing clock and a traveling speed tolerance in the positioning using the A-GPS system.

If the cellular phone handset 1 travels as shown in FIG. 6, a Doppler shift corresponding to the relative speed between the cellular phone handset 1 and the base station 2 causes a shift in communication synchronizing clock. A Doppler shift corresponding to the relative speed between the cellular phone handset 1 and the GPS satellite 3 also causes a shift in range to be searched for the GPS satellite 3. Due to the Doppler effect caused by the travel, the relationship between the allowable error of the communication synchronizing clock and a traveling speed tolerance becomes a relationship as shown in FIG. 7. More specifically, since an increase in the allowable error of the communication synchronizing clock increases a tolerance for a clock shift caused by the Doppler effect, the traveling speed tolerance increases. On the other hand, a decrease in the allowable error of the communication synchronizing clock decreases the traveling speed tolerance.

In other words, the following relationship holds between the allowable error of the communication synchronizing clock and the positioning processing time/traveling speed tolerance:

if the clock allowable error is small, the positioning processing time is short, and the traveling speed tolerance is small; and if the clock allowable error is large, the positioning processing time is long, and the traveling speed tolerance is large.

Combination of setting of the allowable error of the communication synchronizing clock with the above-described feature with positioning mode setting of the GPS function itself described in Patent Document 1 allows a setting that is based on a trade-off between the allowable error and the traveling speed tolerance and shortens the positioning time in the positioning-time-priority positioning mode.

Figure 2:
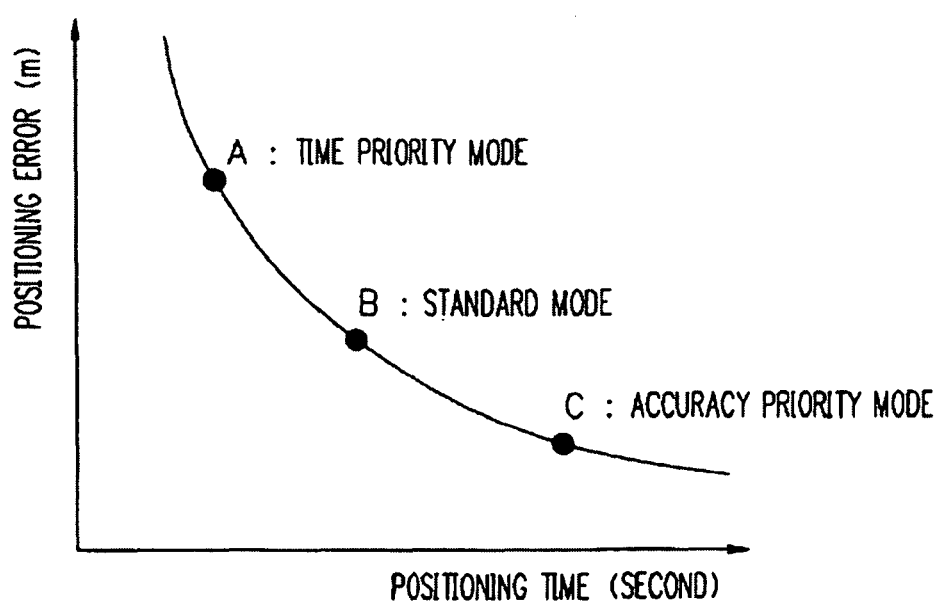
FIG. 2 is a graph for explaining a plurality of positioning modes of a cellular phones handset in the related art.

For this reason, in the exemplary embodiment of the present invention, the value of the allowable error of the communication synchronizing clock (hereinafter referred to as the first value) predetermined by a system designer in consideration of a base station error, an AFC pull-in error, a Doppler error during travel of the terminal, and the like described above is stored in advance in the memory 16, and a second value larger than the first value and a third value smaller than the first value are additionally stored in advance. In the A-GPS system described in Patent Document 1 capable of positioning in a plurality of positioning modes, to whichever of the modes shown in FIG. 2 the positioning mode of the GPS positioning section of the terminal is set, the above-described first value is set in the GPS positioning section as a fixed value of an allowable error of a communication synchronizing clock. In contrast, in the exemplary embodiment of the present invention, the first to third values are stored in the memory 16, and the GPS control section 14 can vary the allowable error of the communication synchronizing clock and set it in the GPS positioning section 15.

If the GPS control section 14 sets the positioning mode of the GPS positioning section 15 to the time priority mode, as indicated by a point A in FIG. 4, and sets the value of the allowable error of the communication synchronizing clock to the third value smaller than the first value, the positioning time is originally short in the mode, and the traveling speed tolerance decreases. However, this allows the time priority mode to have the feature that the positioning time is shortened. On the other hand, if the GPS control section 14 sets the positioning mode of the GPS positioning section 15 to the accuracy priority mode, as indicated by a point C in FIG. 4, and sets the value of the allowable error of the communication synchronizing clock to the second value larger than the first value, although the positioning time becomes long, the traveling speed tolerance increases, and the range of usage scenes increases. This allows the accuracy priority mode to have the feature that the positioning accuracy increases.

Figure 8:
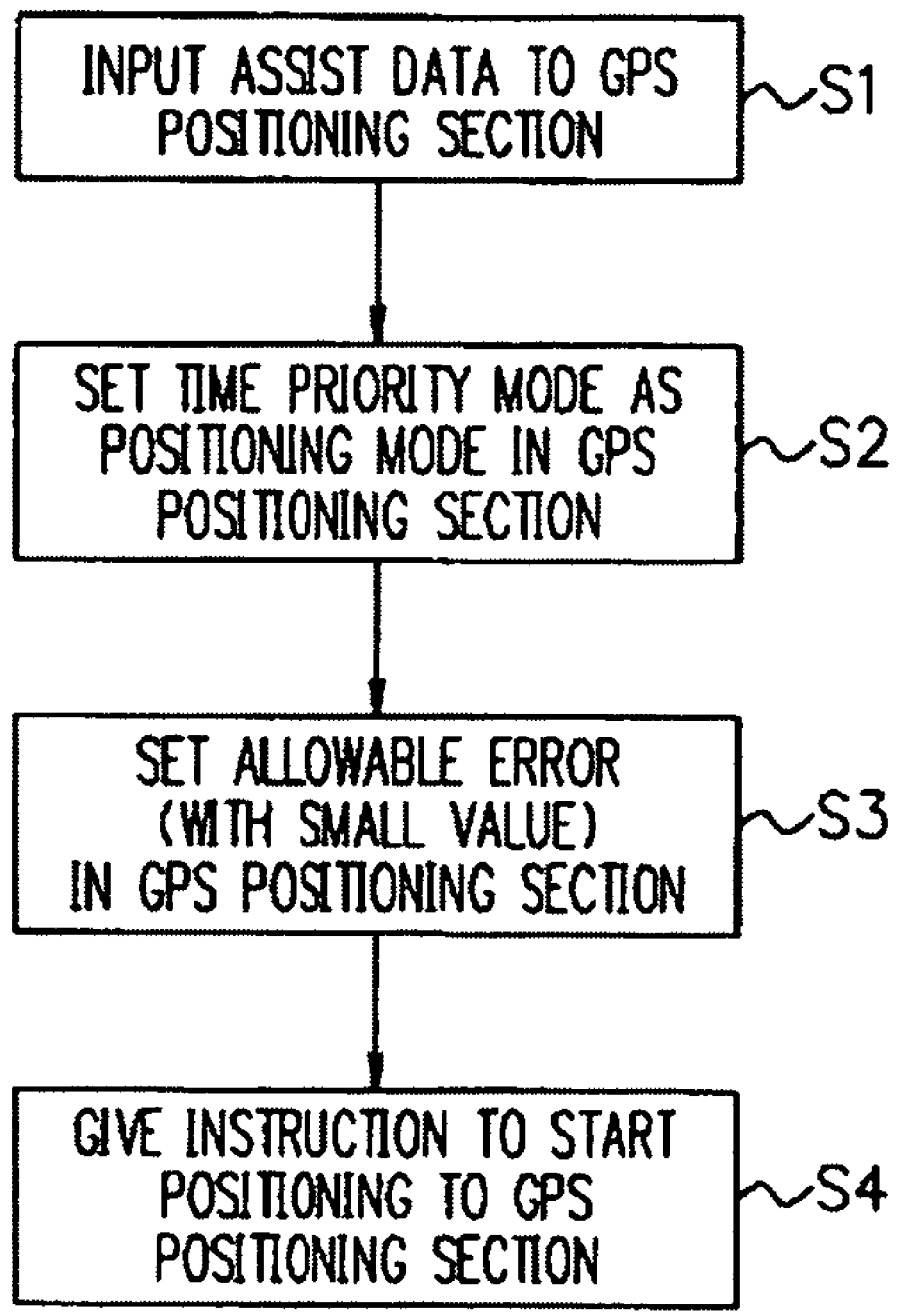
FIG. 8 is a flow chart showing the flow of the operation performed by the cellular phone handset with the GPS function according to the exemplary embodiment of the present invention.

The operation of the cellular phone handset 1 with the GPS function according to the exemplary embodiment of the present invention will now be described with reference to the drawings. FIG. 8 is a flow chart showing the operation of the cellular phone handset 1 with the GPS function in FIG. 3 when setting the positioning mode to the time priority mode and setting the clock allowable error to the third value smaller than the first value.

In FIG. 8, upon receipt of an instruction to start positioning in the time priority mode with the clock allowable error set to be small from the outside through user operation, the GPS control section 14 inputs assist data to the GPS positioning section 15 (step S1) and sets the positioning mode of the GPS positioning section 15 to the time priority mode (step S2). The GPS control section 14 further sets the allowable error of the communication synchronizing clock in the GPS positioning section 15 together with other parameters. At this time, the GPS control section 14 reads out the third value smaller than the first value from the memory 16 and sets the third value as the allowable error of the communication synchronizing clock (step S3). The GPS control section 14 then gives an instruction to start positioning to the GPS positioning section 15 (step S4), thereby causing the GPS positioning section 15 to start GPS positioning.

Figure 9:
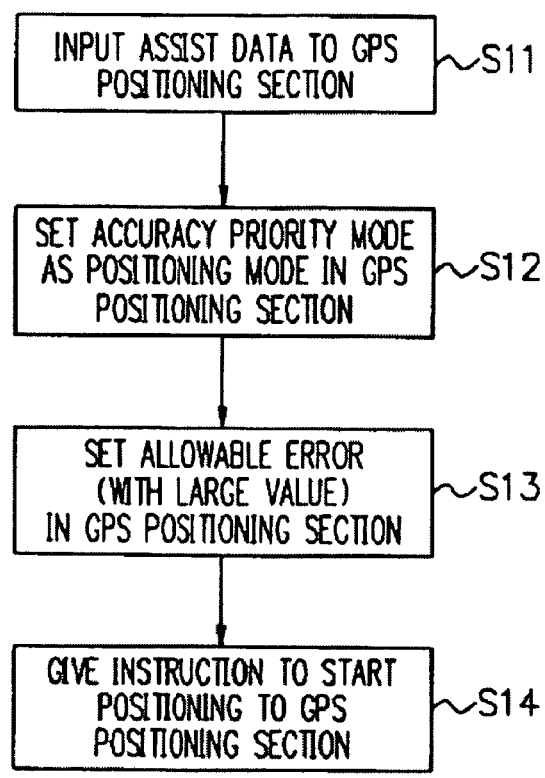
FIG. 9 is a flow chart showing the flow of the operation performed by the cellular phone handset with the GPS function according to the exemplary embodiment of the present invention.

FIG. 9 is a flow chart showing the operation of the cellular phone handset 1 with the GPS function in FIG. 3 when setting the positioning mode to the accuracy priority mode and setting the clock allowable error to the second value larger than the first value.

In FIG. 9, upon receipt of an instruction to start positioning in the accuracy priority mode with the clock allowable error set to be large from the outside through user operation, the GPS control section 14 inputs assist data to the GPS positioning section 15 (step S11) and sets the positioning mode of the GPS positioning section 15 to the accuracy priority mode (step S12). The GPS control section 14 further sets the allowable error of the communication synchronizing clock in the GPS positioning section 15 together with the other parameters. At this time, the GPS control section 14 reads out the second value larger than the first value from the memory 16 and sets the second value as the allowable error of the communication synchronizing clock (step S13). The GPS control section 14 then gives an instruction to start positioning to the GPS positioning section 15 (step S14), thereby causing the GPS positioning section 15 to start GPS positioning.

Note that, when performing the positioning described in Patent Document 1, i.e., performing positioning in a predetermined positioning mode without varying the positioning performance of each positioning mode, the GPS control section 14 may read out the first value as the allowable error of the communication synchronizing clock from the memory 16 and set the first value in the GPS positioning section 15 in step S3 of FIG. 8 or in step S13 of FIG. 9.

FIGS. 4, 8, and 9 show an example in which the allowable error of the communication synchronizing clock is set to a small value in addition to setting of the positioning mode to the time priority mode and an example in which the allowable error of the communication synchronizing clock is set to a large value in addition to setting of the positioning mode to the accuracy priority mode. However, the allowable error of the communication synchronizing clock may be set to a large value when the positioning mode is set to the time priority mode or may be set to a small value when the positioning mode is set to the accuracy priority mode, as shown in FIG. 10.

As described above, if the allowable error of the communication synchronizing clock is set to the second value larger than the first value when the positioning mode is set to the time priority mode, it is possible for the time priority mode to have the feature that although the positioning time becomes somewhat longer, the traveling speed tolerance increases, and the range of usage scenes expands. On the other hand, if the allowable error of the communication synchronizing clock is set to the third value smaller than the first value when the positioning mode is set to the accuracy priority mode, it is possible for the accuracy priority mode to have the feature that although the traveling speed tolerance decreases, the positioning time is shortened.

Figure 10:
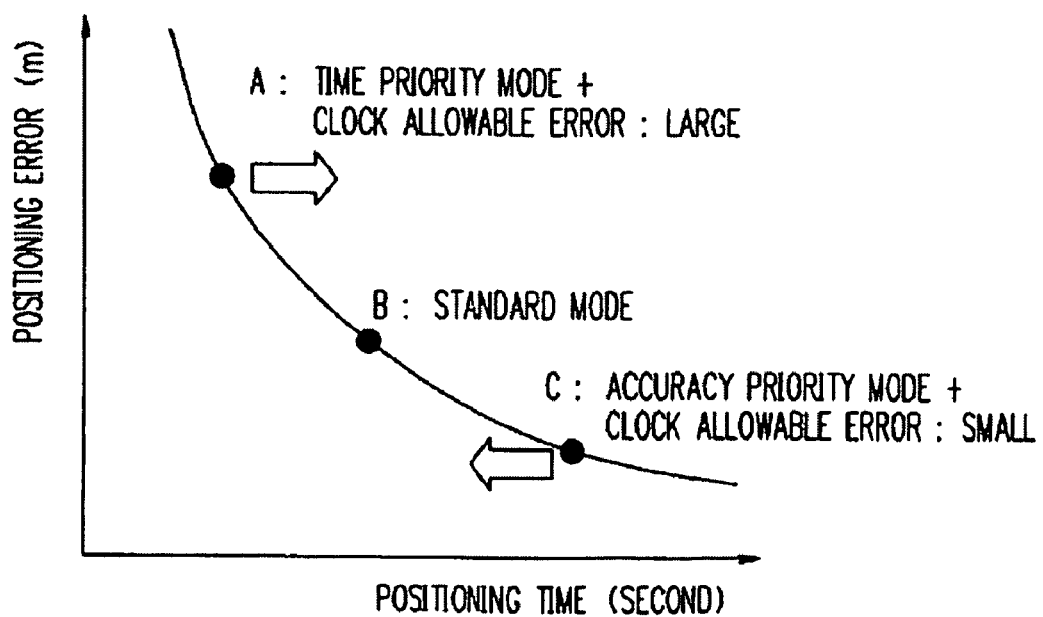
FIG. 10 is a graph showing another example of a change in the positioning performance of each positioning mode when varying the clock allowable error in the exemplary embodiment of the present invention.

It is also possible to set the allowable error of the communication synchronizing clock to the second or third value instead of the first value even when the positioning mode is set to the standard mode indicated by points B in FIGS. 4 and 10. A method for adding a feature to each positioning mode using a combination of the positioning mode setting of the GPS function itself and the allowable error of the communication synchronizing clock, regardless of which specific settings are to be made, is included in the present invention.

An example has been described with reference to FIG. 8 in which the allowable error of the communication synchronizing clock is set to the third value smaller than the first value in addition to setting of the positioning mode to the time priority mode. If GPS positioning by the GPS positioning section 15 after step S4 is unsuccessful, i.e., if a positioning result (the latitude and longitude of the cellular phone handset 1) cannot be obtained even after a lapse of a predetermined time since the start of the positioning, the GPS control section 14 performs the processes in steps S1 to S4 again to cause the GPS positioning section 15 to perform positioning again. At this time, the GPS control section 14 may set the value of the allowable error set in step S3 to a value larger than the third value set the last time (e.g., the second value). As described above, setting the allowable error of the communication clock to a value larger than the third value set the last time increases the traveling speed tolerance and makes it possible to suppress unsuccessful GPS positioning.

As has been described above, in the exemplary embodiment of the present invention, combination of setting of the allowable error of the communication synchronizing clock with the positioning mode setting of the GPS function itself described in Patent Document 1 makes it possible to further vary the positioning performance of each positioning mode (e.g., allows a setting that is based on a trade-off between the allowable error and the traveling speed tolerance and shortens the positioning time in the positioning-time-priority positioning mode).

Note that it is, of course, possible to realize the processing operations of the cellular phone handset 1 according to the flow charts shown in FIGS. 8 and 9 by causing a computer serving as a CPU (control section) to read and execute a program stored in advance in a storage medium such as a ROM in the terminal.

As described above, a mobile communication terminal with a GPS function to which the present invention is applied is a mobile communication terminal with a GPS function including GPS positioning means for performing GPS (Global Positioning System) positioning using assist data received from a network, characterized by comprising control means for varying an allowable error of a communication synchronizing clock established between the mobile communication terminal and a base station of the network which is set in the GPS positioning means for the GPS positioning using the assist data.

The mobile communication terminal with the GPS function is characterized in that the GPS positioning means is capable of operating in a plurality of positioning modes with different positioning performances, and the control means sets, in the GPS positioning means, one of the plurality of positioning modes as a mode in which the GPS positioning means is to operate and varies the allowable error and sets the allowable error in the GPS positioning means.

The mobile communication terminal with the GPS function is characterized in that the control means sets the allowable error to a value larger than a set value and causes the GPS positioning means to perform positioning again if the GPS positioning is unsuccessful.

As described above, the present invention is configured such that the control means varies the allowable error of the communication synchronizing clock as a parameter relating to the positioning performance (a positioning time and a positioning accuracy) of GPS positioning based on the A-GPS system in which a fixed value has been used in the related art and sets the allowable error in the GPS positioning means.

The invention as claimed in the application has been described with reference to an exemplary embodiment. The invention as claimed in the application, however, is not limited to the above-described exemplary embodiment. Various changes understandable by those skilled in the art may be made to the constitution and details of the invention as claimed in the application within the scope of the invention as claimed in the application.

Description of Symbols

1 cellular phone handset
2 base station
3 GPS satellite
11 cellular phone antenna
12 GPS antenna
13 communication section
14 GPS control section
15 GPS positioning section
16 memory

The invention claimed is:

1. A mobile communication terminal with a GPS (Global Positioning System) function including a GPS positioning unit which performs GPS positioning using assist data received from a network, comprising:
    a control unit which varies an allowable error of a communication synchronizing clock established between the mobile communication terminal and a base station of the network which is set in the GPS positioning unit for the GPS positioning using the assist data,
    wherein the GPS positioning unit includes a time priority mode which gives priority to a positioning time and an accuracy priority mode which gives priority to a positioning accuracy, and
    wherein the control unit sets the time priority mode and the accuracy priority mode which is to be operated by the GPS positioning unit, and varies a value of an allowable error of a communication synchronizing clock that is set in advance with respect to the time priority mode and the accuracy priority mode according to an operation by a user.

2. The mobile communication terminal with the GPS function according to claim 1, wherein
    the control unit sets, in the GPS positioning unit, one of a plurality of positioning modes with different positioning performances the GPS positioning unit can operate as a mode in which the GPS positioning unit is to operate, varies the allowable error and sets the allowable error in the GPS positioning unit.

3. The mobile communication terminal with the GPS function according to claim 1, wherein the control unit sets the allowable error to a value larger than a set value and causes the GPS positioning unit to perform positioning again if the GPS positioning is unsuccessful.

4. The mobile communication terminal with the GPS function according to claim 1, further comprising a memory unit including a plurality of values as candidates for a value of the allowable error stored in advance.

5. A positioning system comprising:
    a mobile communication terminal with a GPS function according to claim 1; and
    a network which supplies the assist data to the mobile communication terminal with the GPS function.

6. An operation control method for a mobile communication terminal with a GPS (Global Positioning System) function including a GPS positioning unit which performs GPS positioning using assist data received from a network, said operation control method comprising:
    a step of varying an allowable error of a communication synchronizing clock established between the mobile communication terminal and a base station of the network which is set in the GPS positioning unit for the GPS positioning using the assist data, wherein the GPS positioning unit includes a time priority mode which gives priority to a positioning time and an accuracy priority mode which gives priority to a positioning accuracy, and wherein the control unit sets the time priority mode and the accuracy priority mode which is to be operated by the GPS positioning unit, and varies a value of an allowable error of a communication synchronizing clock that is set in advance with respect to the time priority mode and the accuracy priority mode according to an operation by a user.

7. The operation control method according to claim 6, wherein the step comprises setting, in the GPS positioning unit, one of a plurality of positioning modes with different positioning performances in which the GPS positioning unit is to operate, varying the allowable error and setting the allowable error in the GPS positioning unit.

8. The operation control method according to claim 6, further comprising a step of setting the allowable error to a value larger than a set value and causing the GPS positioning unit to perform positioning again if the GPS positioning is unsuccessful.

9. A storage medium for storing a program for causing a computer to perform an operation control method for a mobile communication terminal with a GPS (Global Positioning System) function including a GPS positioning unit which performs GPS positioning using assist data received from a network, comprising:

a process of varying an allowable error of a communication synchronizing clock established between the mobile communication terminal and a base station of the network which is set in the GPS positioning unit for the GPS positioning using the assist data, wherein the GPS positioning unit includes a time priority mode which gives priority to a positioning time and an accuracy priority mode which gives priority to a positioning accuracy, and wherein the control unit sets the time priority mode and the accuracy, priority mode which is to be operated by the GPS positioning unit, and varies a value of an allowable error of a communication synchronizing clock that is set in advance with respect to the time priority mode and the accuracy priority mode according to an operation by a user.

10. The storage medium for storing the program according to claim 9, wherein the process comprises setting, in the GPS positioning unit, one of a plurality of positioning modes with different positioning performances in which the GPS positioning unit is to operate, varying the allowable error and setting the allowable error in the GPS positioning unit.

11. The storage medium for storing the program according to claim 9, further comprising a process of setting the allowable error to a value larger than a set value and causing the GPS positioning unit to perform positioning again if the GPS positioning is unsuccessful.

12. A mobile communication terminal with a GPS (Global Positioning System) function including GPS positioning means for performing GPS positioning using assist data received from a network, comprising:

a control means for varying an allowable error of a communication synchronizing clock established between the mobile communication terminal and a base station of the network which is set in the GPS positioning means for the GPS positioning using the assist data, wherein the GPS positioning means includes a time priority mode which gives priority to a positioning time and an accuracy priority mode which gives priority to a positioning accuracy, and wherein the control means sets the time priority mode and the accuracy priority mode which is to be operated by the GPS positioning means, and varies a value of an allowable error of a communication synchronizing clock that is set in advance with respect to the time priority mode and the accuracy priority mode according to an operation by a user.

* * * * *